United States Patent
Fang et al.

(10) Patent No.: US 10,948,324 B2
(45) Date of Patent: Mar. 16, 2021

(54) SMALL-DIAMETER ULTRASONIC FLOW METER HAVING OPPOSING TRANSDUCERS

(71) Applicant: Qingdao Hiwits Meter Co., Ltd., Qingdao (CN)

(72) Inventors: Xin Fang, Qingdao (CN); Xinxing Li, Qingdao (CN)

(73) Assignee: QINGDAO HIWITS METER CO., LTD., Qingdao (CN)

( * ) Notice: Subject to any disclaimer, the term of this patent is extended or adjusted under 35 U.S.C. 154(b) by 215 days.

(21) Appl. No.: 16/330,453

(22) PCT Filed: Oct. 13, 2017

(86) PCT No.: PCT/CN2017/106125
§ 371 (c)(1),
(2) Date: Mar. 5, 2019

(87) PCT Pub. No.: WO2011/813346
PCT Pub. Date: Jul. 26, 2018

(65) Prior Publication Data
US 2021/0003435 A1    Jan. 7, 2021

(30) Foreign Application Priority Data
Jan. 23, 2017   (CN) .......................... 201710057701.2

(51) Int. Cl.
*G01F 1/66*         (2006.01)
(52) U.S. Cl.
CPC .............. *G01F 1/667* (2013.01); *G01F 1/662* (2013.01)
(58) Field of Classification Search
CPC .......... G01F 1/667; G01F 1/662; G01F 1/663; G01F 1/666; G01F 1/665
(Continued)

(56) References Cited

U.S. PATENT DOCUMENTS

| 8,689,638 B2 | 4/2014 | Shen |
| 2012/0216627 A1* | 8/2012 | Augenstein ............. G01F 1/662 73/861.28 |
| 2017/0082471 A1* | 3/2017 | Ramanan ................ G01F 1/667 |

FOREIGN PATENT DOCUMENTS

| CN | 101806605 A | 8/2010 |
| CN | 202229859 A | 5/2012 |

(Continued)

*Primary Examiner* — Tarun Sinha
(74) *Attorney, Agent, or Firm* — SZDC Law P.C.

(57) ABSTRACT

A small-diameter ultrasonic flow meter having opposing transducers comprises a circuit box (4), an outer pipe layer (1), an inner pipe layer (2), and a transducer assembly (3). The circuit box (4) is provided at the outer pipe layer (1). The inner pipe layer (2) is formed integrally by injection molding. Transducer installation bases (23) are formed at ends of the inner pipe layer (2). Transducer assemblies (3) are installed at the installation bases (23). The transducer assemblies (3) are arranged in pairs. The inner pipe layer (2) is installed inside the outer pipe layer (1). The transducer assemblies (3) are arranged opposite to each other to perform transmission and reception operations, thereby reducing energy loss. A standard pipe can be used as the outer pipe layer (1), thereby reducing costs. The inner pipe layer (2) can be assembled quickly and conveniently, provides accurate positioning, and has good sealing performance. No water exists in the entire cavity, thereby effectively protecting connection wires of the transducer assemblies (3) from being soaked in water, and providing an allowance space for deformation of the inner pipe layer (2) and a minor expansion of water turning into ice so as to effectively prevent freezing.

4 Claims, 3 Drawing Sheets

(58) Field of Classification Search
USPC .................................................... 73/861.18
See application file for complete search history.

(56) References Cited

FOREIGN PATENT DOCUMENTS

| | | |
|---|---|---|
| CN | 104101399 A | 10/2014 |
| CN | 204214501 U | 3/2015 |
| CN | 104792375 A | 7/2015 |
| CN | 204788578 U | 11/2015 |
| CN | 106595785 A | 4/2017 |
| CN | 206440317 U | 8/2017 |

\* cited by examiner

SMALL-DIAMETER ULTRASONIC FLOW METER HAVING OPPOSING TRANSDUCERS

This application is the National Stage Application of PCT/CN2017/106125, filed on Oct. 13, 2017, which claims priority to Chinese Patent Application No.: 201710057701.2, filed on Jan. 23, 2017, which is incorporated by reference for all purposes as if fully set forth herein.

BACKGROUND OF THE INVENTION

1. Technical Field

The invention belongs to the technical field of flow metering of pipe-delivered fluid, and particularly relates to a small-diameter ultrasonic flow meter having opposing transducers.

2. Description of Related Art

Compared with traditional mechanical flow meters and electromagnetic flow meters, ultrasonic flow meters have the advantages of being higher in metering accuracy, larger in range ratio, capable of better adapting to changes to the temperature, pressure, density and other parameters of measured fluid, higher in adaptability to diameters and horizontal or vertical directions of pipes, convenient to use, beneficial to digital management and the like. At present, ultrasonic flow meters have been widely used for flow measurement in the fields of municipal heat supply, water-related affairs, industrial engineering, mines, power plants and the like and are becoming mature gradually.

However, as for small-diameter pipes, installation of transducers in small channels of the small-diameter pipes with a given standard pipe length is still a technical problem yet to be solved and restrains the application of the ultrasonic flow meters to flow metering of small-diameter pipes in the domestic water field, for instance.

There are two common types of small-diameter ultrasonic flow meters. One type is reflection-type ultrasonic flow meters, such as Chinese Patent Authorization Publication No. CN 201697666 U and Chinese Patent Authorization Publication No. CN 104764499 A. However, these reflection-type ultrasonic flow meters have various drawbacks due to the limitations of their operating principle. Particularly, ultrasonic waves are transmitted by one transducer, then sequentially reflected by two reflection plates and finally received by the other transducer. Energy losses are caused every time the ultrasonic waves are reflected, and the energy of the head waves of the plane sound waves finally received by the transducer is only 14% that of the head waves of the transmitted waves, which means that the energy losses are severe due to the fact that 86% of the ultrasonic waves are diffused by the pipe walls. In addition, secondary waves generated by diffusion lead to superimposed interference on reflected waves of the second reflection surface, and consequentially, clusters are formed, and reception of the transducers is affected and disturbed. The minimum safe value of the head waves capable of being received by the transducers is 20 mv, and in order to maintain the stable signal value, the power and size of the transducers are very large, and nowadays, the transmission area of the transducers is Φ17 mm (after being packaged). The area of the reflection plates is about Φ8 mm. Although a larger angle and area of the reflection plates are beneficial to reflection, vortexes may be generated due to a water blockage if the angle and area of the reflection plates are too large, and consequentially, the stability of the sound wave speed is affected, resulting in inaccurate metering. Scale will be formed on the surface of the reflection plates after the reflection plates are used in water, particularly in hot water, for a long time, and in this case, the reflection efficiency of the reflection plates is reduced. Once the head waves are smaller than 20 mv, signals received by the transducers will be instable, and normal metering is affected. Due to the fact that the transducers have to be installed on the inner sides of external threads at two ends of the pipes so as to meet the installation requirements of movable joints, the distance between the two transducers is decreased within a limited pipe length, and the range ratio of the flow meter is decreased.

The other type are ultrasonic flow meters having opposing transducers. For instance, Chinese Patent Authorization Publication No. CN 201503288 U provides ultrasonic flow meter transducers to be oppositely arranged in a pipe of a segmented structure. As for this structure, the portions of the pipes where the transducers are fixed have a large diameter, joints at two ends of the pipe, and the middle of the pipe has a small diameter, and the portions of the pipes where the transducers are fixed can be formed only by injection molding due to their special structure; and signal output wires are arranged on upper portions of the transducers and are located on inner sides of external threads of the pipe. Under limitations of such structure, the transducers can only be arranged at positions away from both ends of the pipe with the flow meter, so that the sonic path distance of the ultrasonic waves is short, and the range ratio of the flow meter is decreased. In addition, the whole flow meter is made from plastic and is formed section-by-section through injection molding, and then all the sections are fixedly connected with bolts. Under the influence of temperatures, the plastic pipe has large deformation, which will inevitably affect accurate positioning of the transducers and the stability of flow metering. Meanwhile, the flow meter formed by the multiple sections fastened with bolts is difficult to machine and also difficult to assemble and disassemble. When connected with movable joints, the plastic pipe is poor in thread strength and prone to damage and cannot be installed firmly.

BRIEF SUMMARY OF THE INVENTION

To overcome the drawbacks of the small-diameter ultrasonic flow meters in the prior art, the invention provides a small-diameter ultrasonic flow meter having opposing transducers.

A small-diameter ultrasonic flow meter having opposing transducers comprises an outer pipe layer, an inner pipe layer, and transducer assemblies. Transducer installation bases are formed at the ends of the inner pipe layer. The transducer assemblies are installed in the installation bases and are arranged in pairs. The inner pipe layer is installed inside the outer pipe layer.

The diameter of a middle portion of the inner pipe layer is smaller than that of the two ends of the inner pipe layer.

The inner pipe layer comprises a first inner pipe layer and a second inner pipe layer in buckled connection with the first inner pipe layer. Circular boss edges extending outwards in a radial direction are formed at non-connected ends of the first inner pipe layer and the second inner pipe layer. Rectangular bosses extending inwards in an axial direction are formed on the circular boss edges. Two ends of the outer pipe layer are broached to form first holes matched with the circular boss edges. First grooves matched with the rectangular bosses are formed in an inner wall of the outer pipe layer. The number of the rectangular bosses is more than one.

A fastener is arranged at a buckled connection end of the first inner pipe layer and is formed with a circular buckle groove. A clamp is arranged at a buckled connection end of the second inner pipe layer. A second circular protrusion extending outwards in a radial direction is formed on the clamp. The fastener and the clamp are connected in a clamped manner. The second protrusion is fixed in the buckle groove.

The small-diameter ultrasonic flow meter further comprises a first sealing ring and a second sealing ring. First circular grooves are formed in the ends of the first inner pipe layer and the second inner pipe layer. The first sealing ring is arranged in the first circular groove. The second sealing ring is arranged in a cavity formed by the buckle groove and the clamp.

Each transducer assembly comprises a transducer, a sealing gasket, a compression piece and a protective cap which are sequentially arranged in the corresponding installation base from inside to outside. Each installation base comprises an installation hole parallel to a pipe axis and a wire guide hole communicating the installation hole with the outside. Ends of the installation holes are provided with edge protrusions extending inwards in the radial direction and second clamps extending in the axial direction. Each protective cap comprises a second fastener matched with the corresponding clamp and a compression part and is fastened through the second fastener and the second clamp. The compression pieces are further pressed by the compression parts.

The invention has the following beneficial effects:

1. Ultrasonic waves are oppositely transmitted and received, so that under the same signal reception energy, transmission energy of the transducers is low, thus, prolonging the service life of batteries. With a DN20 pipe as an example, the energy of the head waves received by the transducers is increased by four times compared with reflection-type ultrasonic flow meters, so that the size of the transducers can be appropriately decreased to Φ12 mm from Φ17 mm 2. The transducers are arranged under external threads at two ends of the pipe and are closer to the two ends of the pipe, and wires of the transducers are led out via an outlet in the middle of the pipe so that movable joints can be installed without being affected, and the range ratio of the flow meter is increased by calculation according to a time difference formula. With the DN20 pipe as an example, the distance between the two transducers is increased to 85 mm from 60 mm of the reflection-type ultrasonic flow meters.

3. No water exists in the entire cavity between the outer pipe layer and the inner pipe layer of the pipe, so that corrosion and scale formation in metal pipes are effectively solved. Joints of metal pipes are protected against water by plastic flanges so that besides copper and stainless steel pipes, other standard pipes such as galvanized steel pipes and aluminum pipes can also be adopted, and costs are greatly reduced while strength is ensured.

4. Through the design of small stepless transducers, the problem that transducers cannot be installed in small-diameter pipes is solved without increasing pressure losses. The water flow is rectified through software analysis and optimization, so that turbulent flow is reduced, and metering is more accurate, and with the DN20 pipe as an example, the water area of the portions where the transducers are fixed is 1.3 times that of the necking-down portion in the middle.

5. A pipe of the flow meter is simple in structure and does not need to be formed when manufactured, the outer pipe layer can be a standard pipe, and the metal pipe joint is protected by a plastic flange, so that the whole metal pipe is protected against water. In this way, besides copper and stainless steel pipes, other standard pipes such as galvanized steel pipes and aluminum pipes can also be adopted, and costs are greatly reduced while strength is ensured.

6. The inner pipe layer can be conveniently and rapidly assembled, accurately positioned and firmly fastened, and the outer pipe layer is good in sealing performance.

7. A space is reserved between the inner pipe layer and the outer pipe layer, and no water exists in the entire cavity, so that connection wires of the transducers are effectively prevented from being soaked and freezing is effectively prevented. Micro deformation of the inner pipe layer can effectively prevent the pipe against freezing when the ice expands even at the freezing point.

8. The outer pipe layer is made from metal, so that threads will not be damaged when movable joints are installed.

DETAILED DESCRIPTION OF THE INVENTION

The technical solution of the invention is further explained below with reference to the accompanying drawings of an illustrative embodiment of the invention.

Figure 1:
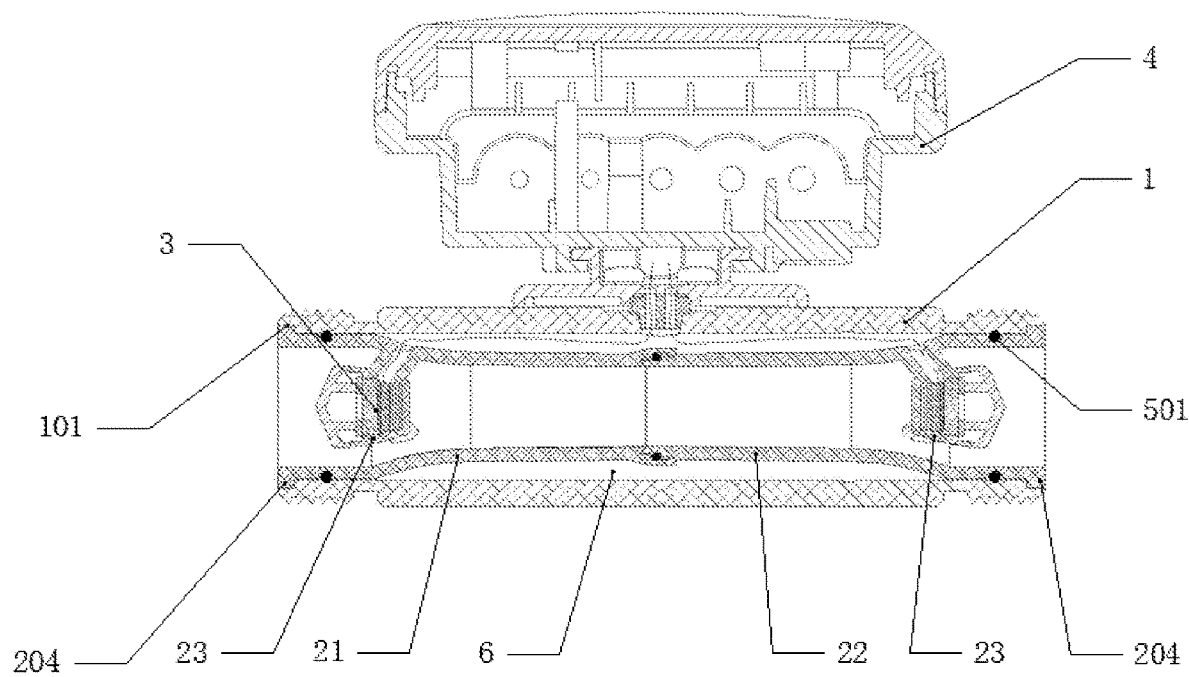
FIG. 1 is a structural view of one embodiment of the invention.

As shown in FIG. 1, a small-diameter ultrasonic flow meter having opposing transducers comprises an outer pipe layer 1, an inner pipe layer 2, transducer assemblies 3 and a circuit box 4, wherein the circuit box 4 is arranged on the outer pipe layer 1, the inner pipe layer 2 is formed integrally by injection molding, transducer installation bases 23 are formed at the ends of the inner pipe layer 1, the transducer assemblies 3 are installed in the transducer installation bases 23 and are arranged in pairs, the outer pipe layer 1 is a standard pipe and has two ends machined with external threads, a to-be-measured pipe is connected into the outer pipe layer 1, and the inner pipe layer 2 is installed inside the outer pipe layer 1.

The outer pipe layer 1 is selected from standard pipes such as galvanized steel pipes and aluminum pipes, thereby being low in material cost, convenient to machine, and high in reliability. The outer pipe layer 1 is arranged outside the inner pipe layer 2 in a wrapping manner to fulfill a protecting and supporting effect, so that the inner pipe layer 2 is protected against deformation under the effect of the environment temperature, which may otherwise affect metering accuracy. The transducer assemblies 3 are arranged in a pipe to oppositely transmit and receive ultrasonic waves, so that compared with the reflection-type ultrasonic flow meters, ultrasonic waves are prevented from being reflected twice, energy losses caused by reflection are avoided, and signals can be recognized by the flow meter if the transducers have a small size. DN20 pipe experiment tests show that the energy reception capacity of the flow meter is four times greater than that of the reflection-type ultrasonic flow meters so that the size of the transducers can be appropriately decreased to Φ12 mm from Φ17 mm. In this way, under the same signal reception energy, the transmission energy of the transducers is low, thus, prolonging the service life of the batteries.

Figure 3:
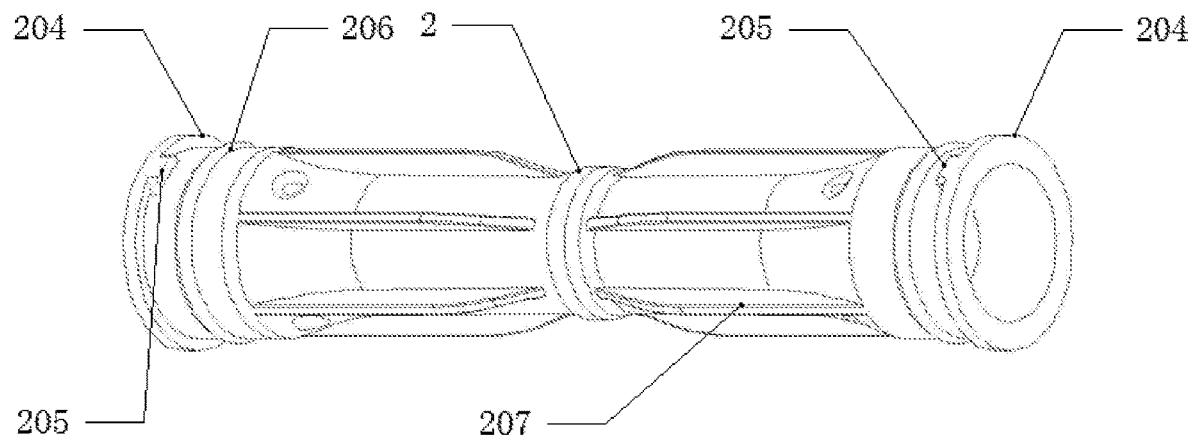
FIG. 3 is a structural view of an inner pipe layer of one embodiment of the invention.

The diameter of a middle portion of the inner pipe layer 2 is smaller than that of two ends of the inner pipe layer 2, and a cavity 6 is formed between an inner wall of the outer pipe layer 1 and an outer wall of the inner pipe layer 2, as show in FIG. 1 and FIG. 3. A reinforcing rib 208 can be arranged on the middle portion of the inner pipe layer 2. Because the diameter of the inner pipe layer 2 is reduced from the two ends to the middle Φ14 mm like the existing heat-supply DN20 flow meters), the flow velocity is high and the time difference variation of the ultrasonic waves is large under the same flow, thus, improving the metering accuracy of the flow meter.

Figure 4:
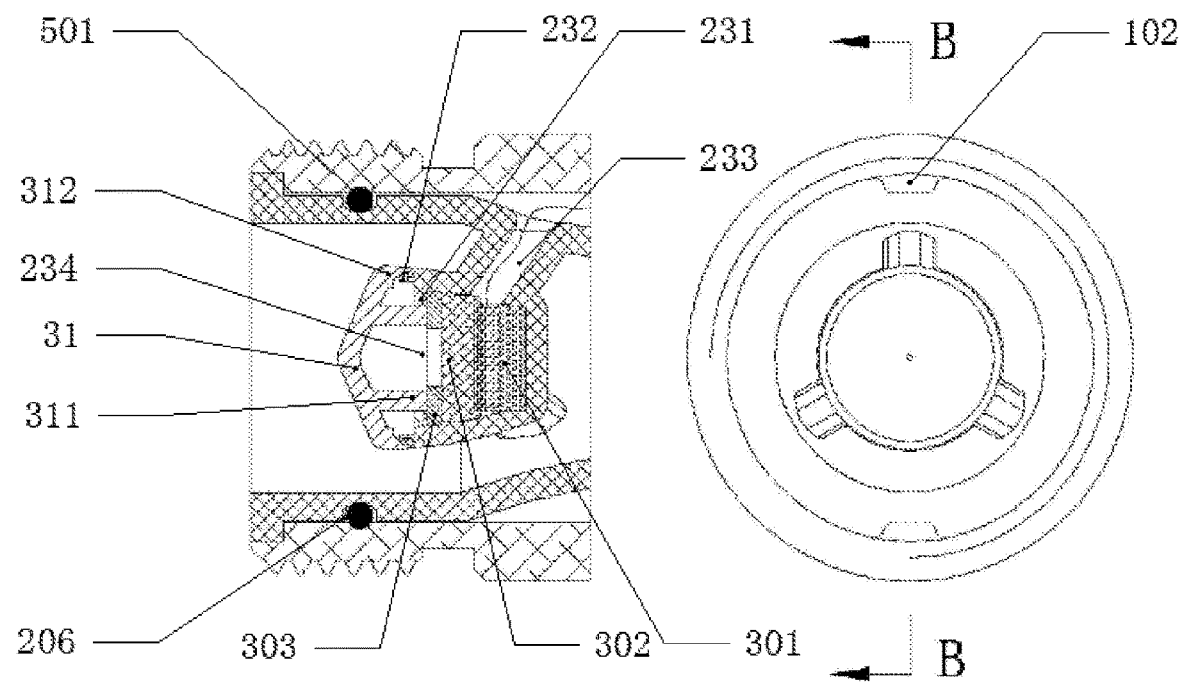
FIG. 4 is a partial structural view of a transducer assembly of one embodiment of the invention.

The inner pipe layer 2 comprises a first inner pipe layer 21 and a second inner pipe layer 22 in buckled connection with the first inner pipe layer 21. As shown in FIG. 1 and FIG. 3, circular boss edges 204 extending outwards in a radial direction are formed at the other end of the first inner pipe layer 21 and the other end of the second inner pipe layer 22, and rectangular bosses 205 extending inwards in an axial direction are formed on the circular boss edges 204. Two ends of the outer pipe layer 1 are broached to form first holes 101 matched with the circular boss edges 204, and first grooves matched with the rectangular bosses 205 are formed in the inner wall of the outer pipe layer 1. The first inner pipe layer 21 and the second inner pipe layer 22 are firmly connected in the buckled manner and cannot move leftwards or rightwards, thereby being prevented from being separated from each other. The circular boss edges 204 are separately clamped in the first holes 101 at the two ends of the outer pipe layer 1, so that the degree of freedom of the inner pipe layer 2 in the axial direction is limited. The rectangular bosses 205 located on the inner pipe layer 2 are clamped in the first grooves 102, so that the degree of freedom of rotation of the inner pipe layer 2 in the axial direction is limited. More than one rectangular boss 205 can be arranged, and as shown in FIG. 4, two rectangular bosses are arranged in this embodiment. Buckled connection is convenient and reliable, can be performed more easily and conveniently than bolted fixation and installation, and ensures accurate and reliable movement, rotation, and positioning of the inner pipe layer 2 in the axial direction.

Figure 2:
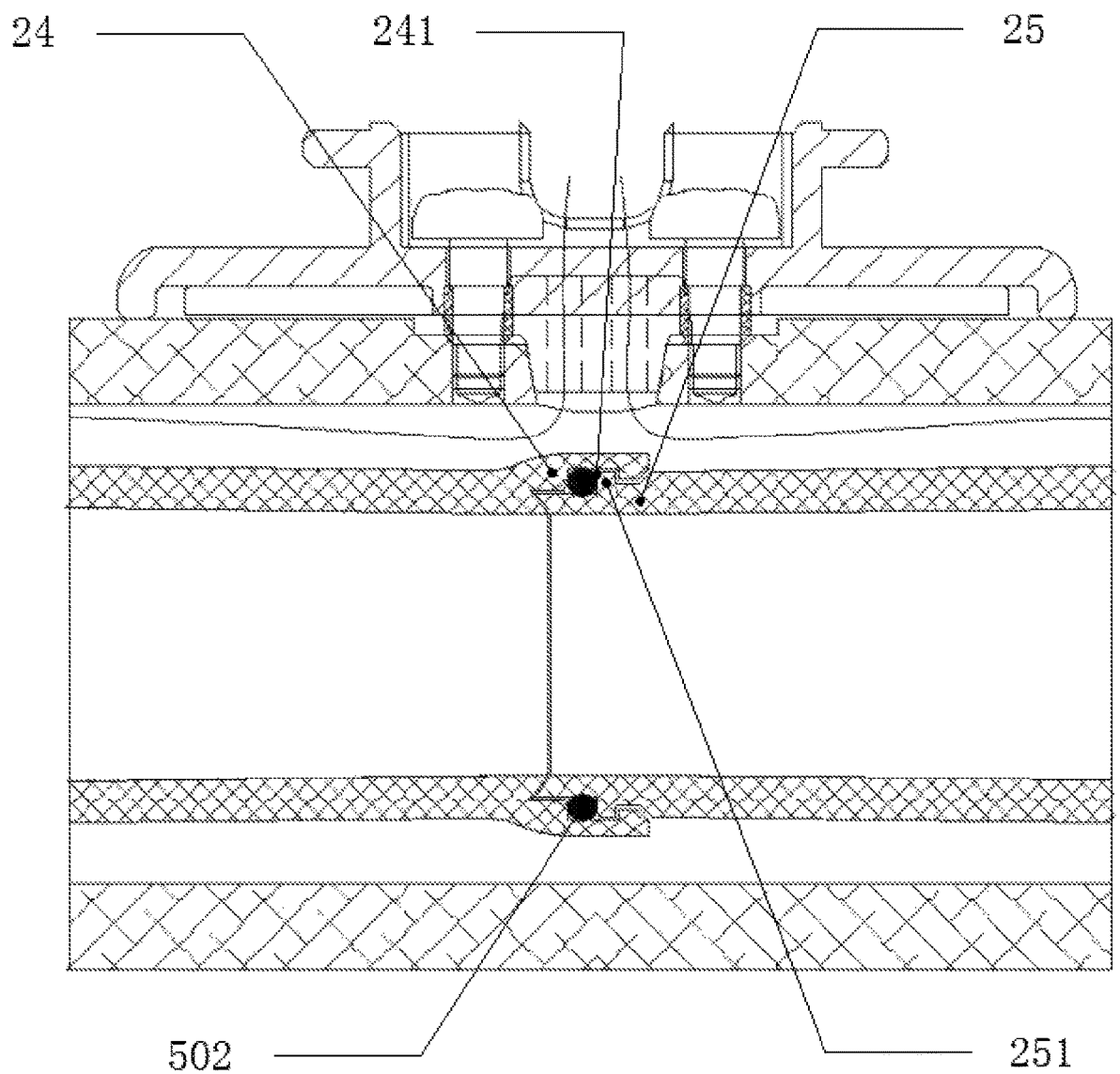
FIG. 2 is a structural view of a middle part of one embodiment of the invention.

Buckled connection of the inner pipe layer 2 is realized as follows: as shown in FIG. 2, a fastener 24 is arranged at a buckled connection end of the first inner pipe layer 21 and is formed with a circular buckle groove 241, a clamp 25 is arranged at a buckled connection end of the second inner pipe layer 22, a second circular protrusion 251 extending outwards in the radial direction is formed on the clamp 25, the fastener 24 and the clamp 25 are connected in a clamped manner, and the second protrusion 251 is fixed in the circular buckle groove 241.

The ultrasonic flow meter further comprises a first sealing ring 501 and a second sealing ring 502. As shown in FIG. 4, first circular grooves 206 are formed in ends of the first inner pipe layer 21 and the second inner pipe layer 22. The first sealing ring 501 is arranged in the first circular groove 206 and is pressed by the inner wall of the outer pipe layer 1, so that water in the pipe is prevented from entering the cavity 6 via a gap between the inner pipe layer and the outer pipe layer. The second sealing ring 502 is arranged in a cavity formed by the circular buckle groove and the clamp 25, so that water in the pipe is prevented from entering the cavity 6 via the bucked connection part.

No water exists in the entire cavity 6 between the outer pipe layer 1 and the inner pipe layer 2 of the pipe, thereby providing an allowance space for a minor expansion of ice so as to effectively prevent freezing of the pipe under a low temperature. Due to the fact that no water exists in the entire cavity, corrosion and scale formation in metal pipes are avoided, and thus, the ultrasonic flow meter can be applied to copper, stainless steel and galvanized water-gas pipes, aluminum pipes, and the like.

Each transducer assembly 3 comprises a transducer 301, a sealing gasket 302, a compression piece 303 and a protective cap 31 which are sequentially arranged in the corresponding installation base 23 from inside to outside. As shown in FIG. 4, each installation base 23 comprises an installation hole 234 parallel to the axis of the pipe and a wire guide hole 233 communicating the installation hole 234 with the outside. Connection wires of the transducers 301 are led into the cavity 6 via the wire guide holes 233 and then enter the circuit box 4. Ends of the installation holes 234 are provided with edge protrusions 231 extending inwards in the radial direction and second clamps 232 extending in the axial direction. The protective caps 31 comprise second fasteners 312 matched with the second clamps 23 and compression parts 311. The compression pieces 303 have an outer diameter equal to the diameter of the installation holes 234 and are pressed in the installation holes 234 through the edge protrusions 231, and then the sealing gaskets 302 elastically deform to be pressed, wherein the sealing gaskets 302 can be made from silica gel. The protective caps 31 are fastened through the second fasteners 312 and the second clamps 232, and the compression parts 311 further press the compression pieces 302 and apply a reactive force to the protective caps 31, so that the transducer assemblies 3 are accurately and firmly installed and positioned. The transducer assemblies 3 are installed under threads located at openings of the pipe. Different from the prior art, there is a large distance between the two transducer assemblies 3. Wires of the transducer assemblies 3 are led out via an outlet in the middle of the pipe, and a sealing gasket is arranged at the outlet in the middle of the pipe, so that external impurities are prevented from entering the cavity 6. With a DN20 pipe as an example, the distance between the two transducers is increased to 85 mm from 60 mm of the reflection-type ultrasonic flow meters, so that the transmission distance, namely sonic path distance, between the opposite transducers is increased. Under the given standard pipe length, the increase of the transmission distance between the opposite transducers is of great importance.

Information about the fluid flow velocity $V_{ave}$ is carried by ultrasonic waves propagating in flowing fluid, so that the fluid flow velocity can be detected according to the reception time difference of the ultrasonic waves, and then the flow rate is worked out according to the fluid flow velocity. The two transducer assemblies 3 used in cooperation transmit ultrasonic waves at the same time and then receive the ultrasonic waves from the opposite side, and the flow rate of fluid in the inner pipe layer 2 can be worked out according to the reception time different M:

$c_1 = c + V_{ave}$, down-flow sound velocity $c_2 = c + V_{ave}$, counter-flow sound velocity $t_1 = L/c_1$, down-flow time $t_2 = L/c_1$, counter-flow time $$\Delta = t_2 - t_1 = L/c_2 - L/c_1 = \frac{2LV_{ave}}{c_2 - V_{ave}^2}$$

$$c \gg V_{ave}$$

$$V_{ave} \approx \frac{\Delta t c^2}{2} * \frac{1}{L}$$

Set constant K, $$K = \frac{\Delta t c^2}{2}$$

$$V_{ave} = K * \frac{1}{L}$$

$$Q_1 = S * V_{ave} * T = S * T * K * \frac{1}{L}$$

The minimum time difference Δt worked out by a time difference chip is 2.5 nS. Under the condition that Δt is kept unchanged, $V_{ave}$ can be effectively decreased by increasing L, which means that the flow meter can measure the maximum flow velocity meeting the accuracy requirement. When the pipe diameter D is given, the sectional area S is determined, T is unit time (hour), and the flow $Q_1$ is in direct proportion to the flow velocity $V_{ave}$, which means that when $V_{ave}$ is decreased, the flow Q' in unit time is decreased, and the range ratio ($Q_3/Q_1$) is increased.

Wherein:
c, the velocity of ultrasonic waves in measured liquid;
c1, velocity of transmitted ultrasonic waves;
t1, transmission time;
c2, velocity of returned ultrasonic waves;
t2, return time;
Δt, time difference
$V_{ave}$, measured minimum average velocity of fluid in the pipe;
L, transmission distance between transducers, namely sonic path distance;
S, pipe cross section;
Q1, minimum flow metered by the flow meter;
Q3, common flow being a constant for given diameters The transducers 301 are designed as small stepless transducers, compression fixing steps are omitted, and the surface size of the transducers 301 is decreased to Φ12 mm, so that the problem that transducers cannot be installed in small-diameter pipes is solved. With the DN20 pipe as an example, the water area of the portions where the transducers are fixed is 1.3 times that of the necking-down portion in the middle, so that the problem that transducers cannot be installed in small-diameter pipes is solved without increasing pressure losses; and the water flow is rectified through software analysis and optimization, so that turbulent flow is reduced, and metering is more accurate.

No water exists in the entire cavity 6 between the outer pipe layer 1 and the inner pipe layer 2 of the pipe, thereby effectively preventing the connection wires of the transducers from being soaked in water.

It would be understood that although certain embodiments of the invention are illustrated and described above, various alterations, modifications, substitutes and transformations can be made by those ordinarily skilled in this field without deviating from the principle and spirit of the invention. The scope of the invention is defined by the claims and equivalents thereof.

What is claimed is:

1. A small-diameter ultrasonic flow meter having opposing transducers, comprising an outer pipe layer, an inner pipe layer and transducer assemblies, wherein transducer installation bases are formed at the ends of the inner pipe layer, the transducer assemblies are installed in the installation bases and are arranged in pairs, and the inner pipe layer is installed inside the outer pipe layer,
  wherein a diameter of a middle portion of the inner pipe layer is smaller than that of two ends of the inner pipe layer; and
  wherein the inner pipe layer comprises a first inner pipe layer and a second inner pipe layer in buckled connection with the first inner pipe layer, circular boss edges extending outwards in a radial direction are formed at non-connected ends of the first inner pipe layer and the second inner pipe layer, rectangular bosses extending inwards in an axial direction are formed on the circular boss edges, two ends of the outer pipe layer are broached to form first holes matched with the circular boss edges first grooves matched with the rectangular bosses are formed in an inner wall of the outer pipe layer, and the number of the rectangular bosses is more than one.

2. The small-diameter ultrasonic flow meter having opposing transducers according to claim 1, wherein a fastener is arranged at a buckled connection end of the first inner pipe layer and is formed with a circular buckle groove, a clamp is arranged at a buckled connection end of the second inner pipe layer, a second circular protrusion extending outwards in the radial direction is formed on the clamp, the fastener and the clamp are connected in a clamped manner, and the second protrusion is fixed in the buckle groove.

3. The small-diameter ultrasonic flow meter having opposing transducers according to claim 2, wherein the small-diameter ultrasonic flow meter further comprises a first sealing ring and a second sealing ring, first circular grooves are formed in ends of the first inner pipe layer and the second inner pipe layer, the first sealing ring is arranged in the first circular groove, and the second sealing ring is arranged in a cavity formed by the buckle groove and the clamp.

4. The small-diameter ultrasonic flow meter having opposing transducers according to claim 3, wherein each said transducer assembly comprises a transducer, a sealing gasket, a compression piece and a protective cap which are sequentially arranged in the corresponding installation base from inside to outside, each said installation base comprises an installation hole parallel to a pipe axis and a wire guide hole communicating the installation hole with the outside, the ends of the installation holes are provided with edge protrusions extending inwards in the radial direction and second clamps extending in the axial direction, each said protective cap comprises a second fastener matched with the second clamp and a compression part and is fastened through the second fastener and the second clamp, and the compression pieces are further pressed by the compression parts.

* * * * *